United States Patent [19]
Schofield et al.

[11] Patent Number: 5,837,046
[45] Date of Patent: Nov. 17, 1998

[54] INK JET PRINTER INK COMPOSITION

[75] Inventors: John David Schofield, Greenmount; John Philip Tatum; Jill Woods, both of Cambridgeshire, all of England

[73] Assignee: Xaar Technology Limited, Cambridge, United Kingdom

[21] Appl. No.: 898,764

[22] Filed: Jul. 23, 1997

Related U.S. Application Data

[63] Continuation of PCT/GB96/00277, Feb. 8, 1996.

[30] Foreign Application Priority Data

Feb. 8, 1995 [GB] United Kingdom .................. 9502439
Feb. 20, 1995 [GB] United Kingdom .................. 9503287

[51] Int. Cl.⁶ .................................................. C09D 11/02
[52] U.S. Cl. .................... 106/31.86; 106/316; 106/31.88
[58] Field of Search .............................. 106/31.86, 31.88, 106/31.6

[56] References Cited

U.S. PATENT DOCUMENTS

| | | | |
|---|---|---|---|
| 3,946,138 | 3/1976 | Jones | 106/31.86 |
| 4,256,494 | 3/1981 | Yamamoto et al. | 106/31.86 |
| 4,954,174 | 9/1990 | Imagawa | 106/31.86 |
| 5,350,446 | 9/1994 | Lin et al. | 106/31.88 |
| 5,453,121 | 9/1995 | Nicholls et al. | 106/31.88 |
| 5,702,512 | 12/1997 | Yano et al. | 106/31.75 |

FOREIGN PATENT DOCUMENTS

| | | |
|---|---|---|
| 454872 | 11/1991 | European Pat. Off. . |
| 60-4572 | 1/1985 | Japan . |
| 62-22872 | 1/1987 | Japan . |
| 4-45175 | 2/1992 | Japan . |
| 4-202386 | 7/1992 | Japan . |
| 6-93220 | 4/1994 | Japan . |

*Primary Examiner*—Helene Klemanski
*Attorney, Agent, or Firm*—Marshall, O'Toole, Gerstein, Murray & Borun

[57] ABSTRACT

An ink jet printer ink of the kind comprising a dispersion of a pigment in a non-aqueous diluent wherein the diluent is a single phase liquid comprising a major amount of aliphatic hydrocarbon and a minor amount of a polar component, comprising oleyl alcohol alone or in combination with a least one other polar liquid such as an ether or an ester.

15 Claims, No Drawings

INK JET PRINTER INK COMPOSITION

This is a continuation of international application no. PCT/GB96/00277 filed Feb. 8, 1996.

The present invention relates to ink compositions for use in ink jet printers and in particular to such compositions comprising a dispersion of a pigment in a non-aqueous diluent.

Ink-jet printers of the kind wherein drops of ink are forced under pressure through very small nozzles in a printing head are of increasing interest both for office and general industrial use. In one kind of printer, known as a "continuous" printer, ink droplets which are produced continuously are passed through a charging area where individual droplets receive an electrical charge in response to a signal and are directed towards a substrate to be printed. The droplets pass through an electrical field causing them to be deflected by an amount which is dependent on the intensity of the charge and the field. Droplets not required to form print on the substrate are directed to a by-pass gutter. Inks for use in such printers need to be conductive. In another kind of printer, known as a "drop-on-demand" (DOD) printer, the ink droplets are expelled from the nozzle of a print head only when required during the printing process. Drop-on-demand printers can use an electrostatically accelerated ink jet or droplet sequences ejected by pressure impulse actuation. In the latter kind of DOD printer, each drop of ink is individually ejected from a nozzle by means of pressure pulses induced e.g. by use of a piezo-electric actuator acting on the ink in the channel supplying the nozzle or by generation of a vapour bubble in response to a thermal pulse. Inks for use in this kind of printer do not need to be electrically conductive and preferably are non-ionic and of very low conductivity, e.g. having a resistivity of at least $10^6$ ohm cm.

In parallel with the development of these printers has been the development of the special inks suitable for use in them.

These inks are required to meet a number of criteria. For example, they must be capable of storage without deterioration and in particular without significant settling of the pigment particles or solidification under normal climatic conditions. They must also be sufficiently fluid at normal printer operating temperatures (usually 10°–40° C.) to be able to be ejected from the printhead nozzle using moderate pressures. They must not deteriorate in quiescent periods in the printhead nozzle during normal operation, e.g. due to evaporation of the diluent, phase separation, solidification or attack by atmospheric air or moisture, and they should not wet the zone of the printhead surrounding the nozzle orifice to an extent that can lead to flooding of the printhead which in turn may lead to aberrant operation. To ensure that wetting of the printhead does not occur to an unacceptable extent, it has been found desirable for the ink to have a dewetting velocity of at least 100 $\mu$m sec$^{-1}$ when measured, on a surface having a surface energy of 10±1 mN.m$^{-1}$. The surface energy is measured as the critical surface tension from static contact angles of pure liquids using the method of Zisman described at page 351 ff of "Physical Chemistry of Surfaces" by Adamson AW 3rd Edition, John Wiley & Sons 1976. An example of such a surface is described in British patent application 9417445.5 filed 30 Aug. 1994. For discussion of dewetting velocity and its measurement, reference is made to the article by Redon et al in Physical Review Letters, Vol. 66, No. 6, 11 Feb. 1991, pages 715–718. Preferably, the dewetting velocity of the ink is at least 200, more preferably at least 300, and still more preferably at least 1,000 $\mu$m.sec$^{-1}$, when measured as defined above.

Another property of the ink which has been found to be important is its surface tension which should preferably be in the range of about 22 to 36 mN.m$^{-1}$ at 25° C., and more preferably 24 to 32.

The inks must also provide print of good definition and as coated papers are expensive, it is generally accepted that ink jet printer inks must be capable of providing well defined print of good colour density on plain, i.e. uncoated paper.

Good print definition quality requires inter alia (a) rapid formation of a solid coloured dot from the ink composition, (b) concentration of the ink colorants on the surface of the paper (c) control of the spread of the dot of colour formed on the surface of the paper substrate from the ink droplet, (d) limited bleed of ink of one colour from a dot to a neighbouring dot of a different colour and uniformity of colour and colour density over the area of the solid dot formed from the droplet. Preferably, also the print should not deteriorate as a result of the action of water or light.

Many of the above criteria dictate contrary properties in the ink. For example, while reducing viscosity increases fluidity, it increases the risk of spread of the ink droplet on the paper surface before the ink dries. Likewise while the risk of the ink drying in the nozzle is reduced by lowering the volatility of the diluent, the opposite maybe required to assist rapid drying of the ink droplet on the substrate. Thus optimising these properties is a matter of compromise. Moreover, varying the compositions of the ink in an attempt to achieve optimisation of these properties is often found to adversely affect other desired properties.

There is, thus, a continuing search for improved inks, especially with the continuing trend towards smaller nozzles and higher resolution image formation.

We have now developed an ink which meets or closely approaches the above-mentioned criteria and which is capable of consistently producing print of excellent quality over extended periods of time and with the use of printheads wherein the nozzle diameter is 50 $\mu$m or even less, e.g. 20 $\mu$m or less.

According to the present invention, there is provided an ink jet printer ink comprising a pigment dispersed in a non-aqueous diluent wherein the diluent is a single phase liquid comprising aliphatic hydrocarbon and a polar component, the aliphatic hydrocarbon forming a major amount of the diluent, by weight, and the polar component being oleyl alcohol alone or in combination with at least one other polar liquid.

The aliphatic hydrocarbon component of the ink, which forms more than 50% by weight of the diluent, and preferably more than 50% by weight of the ink composition, may comprise a single component or a mixture and may be, for example, a distillate from the fractionation of natural or synthetic hydrocarbon mixtures e.g. as sold under the trade name EXXSOL. In general, it will have a boiling point of at least 100° C. and preferably at least 200° C. Where it is a mixture, the boiling point is to be understood to mean the temperature at which the mixture starts to boil.

While the diluent must be mainly hydrocarbon in nature, the presence of a minor amount of a polar component which includes oleyl alcohol is essential. The alcohol may be used alone or together with one or more other polar liquids, e.g. esters, ethers, amides or other alcohols. Ethers are preferred and examples include monoalkyl ethers of ethylene and propylene glycols and polyglycols, e.g. ethylene glycol monobutyl ether, dipropylene glycol monomethyl ether and tripropylene glycol monomethyl ether. It will be understood that the nature and quality of said other polar liquid must be such that the boiling point of the diluent is at least 100° C., preferably at least 200°. On the other hand, the ink must remain fluid at all likely operating temperatures and therefore it is desirable that its freezing point, or the temperature at which solids first start to form, is not more than 10° C. and preferably not more than 7° C.

The amount of oleyl alcohol, or mixture of oleyl alcohol and other polar liquid, present in the diluent should be such as to provide a diluent having a polar solubility parameter not less than 0.1 MPa$^{1/2}$, since otherwise problems related to wetting of the zones surrounding the orifice may arise. On the other hand, this parameter should preferably be not greater than 5 MPa$^{1/2}$ since otherwise problems of compatibility with other materials in the printing system may be introduced. Preferably this parameter will be in the range 0.2 to 2 MPa$^{1/2}$. References herein to polar solubility parameter are to the values obtained according to the method of Hansen, C. M. and Skaarup, K., Journal of Paint Technology, 39 No. 51, pp. 511–514 (1967) as detailed by Patton, T. C. "Paint Flow & Pigment Dispersion" 2nd Ed., Wiley Interscience, 1979. It is also important that the total amount of polar liquid employed be such that the resultant mixture with the hydrocarbon is single phase.

Thus, the amount of oleyl alcohol included in the ink will depend on whether it is the sole polar liquid component or whether it is used in admixture with other polar liquids and, if so, the concentration and polarity of those liquids. In general, it will be employed in an amount of 5 to 40%, more preferably 10 to 40%, by weight of the total weight of the diluent where it is the sole polar component and in amounts in the range 5 to 30% by weight where it is used with other polar liquids. The total amount of polar liquid will generally be in the range 5 to 45%, preferably 10 to 40%, by weight.

As stated before, the diluent must be non-aqueous; that is to say, it must contain no more than 5% water, by weight. In any event, the amount of water present, if any, must not be such as to cause formation of a second liquid phase.

Any suitable pigment may be used provided it will form a stable dispersion in the chosen diluent. Preferred pigments are found amongst those characterised as pigment dyes in The Colour Index. Preferably the pigment will be of a primary substractive hue. The pigment should be lightfast, and thermally stable even with repeated warming. The pigment should be water insoluble once applied to the substrate to prevent smearing upon contact with water-containing substances. Carbon blacks may also be used.

The particle size of the pigment is suitably 1.5 $\mu$m or less and preferably not greater than 1.0 $\mu$m, more preferably not greater than 0.5 $\mu$m, still more preferably not greater than 0.3 $\mu$m.

It is also preferred that the specific gravity of the pigment is close to that of the chosen solvent since this reduces the likelihood of precipitation on standing.

The appropriate concentration of the pigment will depend upon its nature but in general will be in the range of 2 to 20% by weight of the ink, and more usually 4 to 15%.

In general, it will be necessary to include a dispersant to effectively disperse the pigment particles in the diluent and stabilise the dispersion. Preferably the dispersant will be in solution in the diluent; that is to say, it will be dissolved in the diluent or will be so highly solvated that the mixture of diluent and dispersant will be indistinguishable from a true solution.

The dispersant must be capable of stabilising a dispersion of the chosen pigment in the required concentration in the chosen solvent and maintaining the dispersion while in storage and under the operating conditions encountered in the printhead. Polymeric dispersants are generally preferred because of their efficiency. Examples of suitable dispersants are polyester amine dispersants e.g. those sold by Zeneca Colours under the trade name SOLSPERSE and especially those described in GB-A-2001083, namely comprising the reaction product of a poly(lower alkylene)imine with a polyester having a free carboxylic acid group, in which there are at least two polyester chains attached to each poly(lower alkylene)imine chain. Examples of other dispersants that may be used are those marketed under the trade names EFKA and DISPERBYK. Mixtures of dispersants may be used if desired.

For a given combination of diluent, dispersant and pigment, the appropriate amount of dispersant may readily be determined by experiment. In general it has been found that as the concentration of dispersant is increased from zero, the viscosity of the mixture decreases to a minimum and then commences to increase again. The theoretically optimum amount of dispersant is that which gives the minimum viscosity for the mixture since that should provide the most effective dispersion of the pigment. In general, suitable amounts of dispersant will be found to lie in the range 100 to 200% of that optimum amount, more preferably 110 to 150%. Larger amounts may also be provided; however, in general, the amount of dispersant will be approximately 10 to 100% by weight of the amount of pigment employed.

The energy required to eject a droplet of ink is a function, inter alia, of viscosity and for this and other reasons it is preferred that the viscosity of the ink be no greater than 60 mPa.s. The viscosity is determined largely by the viscosity of the diluent and the nature and concentration of the dispersant; however the nature and concentration of the pigment is also a factor. The most preferred range for viscosity is 6–30 mPa.s, measured at 30° C. using a Bohlin CS Viscometer. The invention is now illustrated by the following Examples in which all parts are by weight.

EXAMPLE 1

An ink was prepared from 65.05 parts of a mixture of aliphatic hydrocarbons having a boiling range of 280° to 317° C. and marketed as EXXSOL D140 by EXXON, 20 parts of an oleyl alcohol marketed by Croda as NOVOL, 3.75 parts of a 40% solution of a polyesteramine hyperdispersant in aliphatic hydrocarbon (SOLSPERSE 13940), 0.2 part of substituted ammonium phthalocyanine sulphonate (SOLSPERSE 5000) and 11 parts of REGAL Black. SOLSPERSE 13940 and SOLSPERSE 5000 are both marketed by Zeneca Colours. SOLSPERSE is a trade mark, the property of Zeneca Limited.

The properties of the ink were as follows:

| | |
|---|---|
| Boiling point: | >250° C. |
| Freezing point: | 6° C. |
| Polar solubility parameter: | 0.25 MPa$^{0.5}$ |
| Viscosity[1]: | 9.5 mPa · s |
| Dewetting velocity[2]: | 1 mm sec$^{-1}$ |
| Surface tension[3]: | 28.5 mN · m$^{-1}$ |

[1]measured using a Bohlin CS rheometer with CP 4/40 measuring system at 30° C.
[2]measured as described on a fluorosilane surface having a surface energy of 10 ± 1 mN · m$^{-1}$.
[3]measured using a Krüss K12 Processor Tensiometer System at 20° C.

The ink was stable in storage, could be used to print continuously for substantial periods without blockage or malfunction and gave print of excellent definition.

EXAMPLES 2 TO 5

In a series of experiments, the effect on stability of varying the concentration of NOVOL in the ink of Example 1 (the total amount of NOVOL and EXXSOL D140 remaining unchanged) was examined.

Stability was evaluated by determining the wavelength dependence of the turbidity of the ink. Over wide regions of the turbidity spectrum, the turbidity, $\tau$, is related to the wavelength, $\lambda$, by $\tau = k/\lambda^{exp}$, where exp depends on the particle size. The value of exp is obtained by the following method: ink is diluted 1:5,000 in a liquid blend equivalent to the ink diluent, and optical densities (ODs) are measured in 1 cm path length cuvettes in a Cary I UV-Visible spectrophotometer between 400 and 900 nm.exp is obtained as the slope from linear regression of $\log_{10}(OD)$ against $\log_{10}(\lambda)$. To evaluate stability, samples of ink were stored at 65° C.

and room temperature, and turbidimetric measurements were made periodically over 12 weeks. The ink may be considered as stable if the reduction in value of exp is 15% or less over a 12 week period. The results are as follows.

| Example | 2* | 3* | 4 | 5 |
|---|---|---|---|---|
| NOVOL (%) | 0 | 2.5 | 10 | 15 |
| exponent 0 week | 1.03 | 1.03 | 1.06 | 1.03 |
| exponent 1 week | 0.69 | 1.04 | 0.99 | 1.03 |
| exponent 2 week | 0.55 | 0.83 | 0.99 | 1.02 |
| exponent 4 week | 0.47 | 0.66 | 0.98 | 1.00 |
| exponent 6 week | — | 0.62 | 0.95 | 0.99 |
| exponent 8 week | — | 0.61 | 0.94 | 0.93 |
| exponent 12 week | — | 0.62 | 0.91 | 0.97 |

*Comparative Examples

EXAMPLE 6

The ink of Example 1 was modified by reducing the amounts of EXXSOL D140 and NOVOL to 57.30 and 17.75 parts, respectively, and including 10 parts of tripropylene glycol monomethyl ether. The resultant composition had a boiling point and freezing point similar to that of Example 1, a polar solubility parameter of 1.07 $MPa^{0.5}$, a viscosity of 9 mPa.s, a surface tension of 24.9 $mN.m^{-1}$ and a dewetting velocity of 1.6 $mm.sec^{-1}$. Its performance was similar to that of the ink of Example 1.

EXAMPLE 7

An ink was prepared with the following composition

| REGAL Black 250R | 11% |
|---|---|
| SOLSPERSE 13940 | 3.75% |
| SOLSPERSE 5000 | 0.2% |
| COASOL | 20% |
| NOVOL | 17.5% |
| EXXSOL D140 | 47.55% |

COASOL is a mixture of dibutyl esters of succinic, glutaric and adipic acids. The ink had a viscosity of 10 mPa.s, a polar solubility parameter of 1.1 $MPa^{1/2}$ and properties very similar to the ink of Example 6.

The following are Examples of inks in accordance with the invention employing pigments other than black.

EXAMPLE 8

| PALIOTOL Yellow D1115 | 5% |
|---|---|
| SOLSPERSE 13940 | 3.75% |
| NOVOL | 24% |
| EXXSOL D140 | 67.25% |

EXAMPLE 9

| MONASTRAL Blue FGX | 5% |
|---|---|
| SOLSPERSE 13940 | 5% |
| SOLSPERSE 5000 | 0.5% |
| NOVOL | 15% |
| EXXSOL D140 | 74.5% |

EXAMPLE 10

| HOSTAPERM Red E5B02 | 9% |
|---|---|
| SOLSPERSE 13940 | 8% |
| NOVOL | 9% |
| EXXSOL D140 | 74% |

The inks of Examples 8 to 10 had a viscosity of 10±0.5 mPa.s and dewetting velocities in the range 1.2 to 2.7 $mm.sec^{-1}$. They were all stable on storage, could be used to print continuously for substantial periods without blockage or malfunction and give print of excellent definition.

We claim:

1. An ink jet printer ink comprising a pigment dispersed in a non-aqueous diluent wherein the diluent is a single phase liquid comprising aliphatic hydrocarbon and a polar component, the aliphatic hydrocarbon forming more than 50% by weight of the diluent and the polar component being oleyl alcohol alone or in combination with at least one other polar liquid.

2. An ink jet printer ink as claimed in claim 1 which further includes a dispersant.

3. An ink jet printer ink as claimed in claim 2 wherein the dispersant is a polyester amine.

4. An ink jet printer ink as claimed in claim 2 wherein the dispersant is the reaction product of a poly(lower alkylene) imine with a polyester having a free carboxylic acid group, in which there are at least two polyester chains attached to each poly(lower alkylene)-imine chain.

5. An ink jet printer ink as claimed in claim 1 in which the polar component of the diluent comprises oleyl alcohol and at least one of an ester and an ether.

6. An ink jet printer ink as claimed in claim 1 in which the polar component forms from 5 to 40% by weight of the ink.

7. An ink jet printer ink as claimed in claim 1 in which the polar component forms from 10 to 40% by weight of the ink.

8. An ink jet printer ink as claimed in claim 1 in which the pigment is present in an amount of from 4 to 15% by weight of the ink.

9. An ink jet printer ink as claimed in claim 1 in which the dispersant is present in an amount which is from 110 to 150% of the amount which gives the minimum viscosity for the ink.

10. An ink jet printer ink as claimed in claim 1 wherein said ink has a boiling point of at least 200° C.

11. An ink jet printer ink as claimed in claim 1 wherein said ink has a freezing point not more than 7° C.

12. An ink jet printer ink as claimed in claim 1 wherein said ink has a polar solubility parameter in the range 0.2 to 2 $Mpa^{1/2}$.

13. An ink jet printer ink as claimed in claim 1 wherein said ink has a dewetting velocity of at least 200 $\mu m.sec^{-1}$ when measured on a surface having a surface energy of 10±1 $mN.m^{-1}$.

14. An ink jet printer ink as claimed in claim 1 wherein said ink has a viscosity in the range 6 to 30 mPa.s, measured at 30° C. using a Bohlin CS rheometer with CP 4/40 measuring system.

15. An ink jet printer ink as claimed in claim 1 wherein said ink has a surface tension in the range of 24 to 32 $mN.m^{-1}$ at 25° C.

* * * * *